United States Patent
Perkins

(10) Patent No.: US 8,537,030 B2
(45) Date of Patent: Sep. 17, 2013

(54) PEDESTRIAN ALERT SYSTEM AND METHOD

(75) Inventor: William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 12/705,752

(22) Filed: Feb. 15, 2010

(65) Prior Publication Data
US 2011/0199199 A1 Aug. 18, 2011

(51) Int. Cl.
*G08G 1/00* (2006.01)

(52) U.S. Cl.
USPC ........ 340/904; 340/425.5; 340/435; 340/436; 340/463; 340/468; 340/474; 340/944; 340/989

(58) Field of Classification Search
None
See application file for complete search history.

(56) References Cited

U.S. PATENT DOCUMENTS

| | | | | |
|---|---|---|---|---|
| 3,917,024 | A * | 11/1975 | Kaiser, Jr. | 181/163 |
| 5,450,494 | A * | 9/1995 | Okubo et al. | 381/57 |
| 5,515,026 | A | 5/1996 | Ewert | |
| 6,223,125 | B1 | 4/2001 | Hall | |
| 6,731,202 | B1 * | 5/2004 | Klaus | 340/425.5 |
| 6,956,469 | B2 | 10/2005 | Hirvonen et al. | |
| 7,010,129 | B1 * | 3/2006 | Schaaf et al. | 381/93 |
| 7,095,336 | B2 | 8/2006 | Rodgers et al. | |
| 7,489,236 | B2 | 2/2009 | Chavarria | |
| 7,598,848 | B2 | 10/2009 | Takagi et al. | |
| 7,979,147 | B1 * | 7/2011 | Dunn | 700/94 |
| 2003/0122420 | A1 * | 7/2003 | Tarabishy et al. | 303/191 |
| 2004/0172959 | A1 * | 9/2004 | Oomura et al. | 62/228.1 |
| 2005/0232432 | A1 * | 10/2005 | Yasushi et al. | 381/17 |
| 2007/0229235 | A1 | 10/2007 | Hirai | |
| 2008/0024289 | A1 | 1/2008 | Pino | |
| 2008/0094254 | A1 | 4/2008 | Hill | |
| 2009/0002197 | A1 | 1/2009 | Cemper | |
| 2009/0066499 | A1 * | 3/2009 | Bai et al. | 340/459 |
| 2009/0080672 | A1 * | 3/2009 | Smith | 381/86 |

(Continued)

FOREIGN PATENT DOCUMENTS

WO 2007110654 A1 10/2007

OTHER PUBLICATIONS

PEAS—Pedestrian Alert System,bewa intraf, Sweden, Oct. 6, 2008, pp. 1-2.
Bu, F., et al., Pedestrian Detection in Transit Bus Application: Sensing Technologies and Safety Solutions, Intelligent Vehicles Symposium, 2005. Proceedings, IEEE, Jun. 6-8, 2005, pp. 100-105, http://ieeexplore.ieee.org/Xplore/login.jsp?url=http...F01505085.pdf%3Farnumber%3D1505085&authDecision=-203.
Kallhammer, J.E., et al, Near Zone Pedestrian Detection Using a Low-Resolution FIR Sensor, Intelligent Vehicles Symposium, 2007 IEEE, Jun. 13-15, 2007, pp. 339-345, http://ieeexplore.ieee.org/Xplore/login.jsp?url=http...2F4290054%2F4290055%2F04290137.pdf&authdecision=-203.
Honda Motor Company Co., Ltd., Honda Introduces the All-New Legend, Tokyo, Japan, Oct. 7, 2004, pp. 1-8, http://www.world.honda.com/news/2004/4041007.html.
Rosenblum, Lawrence, Subtle Changes Can Make Hybrids Safely Heard, http://www.tennessean.com/apps/pbcs.dll/article?AID=/20080604/OPINION01/806040422/1008, pp. 1.

*Primary Examiner* — Benjamin C Lee
*Assistant Examiner* — Curtis King
(74) *Attorney, Agent, or Firm* — Frank A. MacKenzie; Brooks Kushman P.C.

(57) ABSTRACT

A pedestrian warning or alert system and method are disclosed. The warning system is mounted on an electric vehicle. The warning system includes a front speaker system, a rear speaker system, a front pedestrian detector, a rear pedestrian detector, and an electronic control unit (ECU) electronically coupled to the front speaker system, the rear speaker system, the front pedestrian detector, and the rear pedestrian detector. The ECU commands the front speaker system to emit a warning sound based on the front pedestrian detector detecting a pedestrian-shaped object and commands the rear speaker system to emit a warning sound based on the rear pedestrian detector detecting a pedestrian-shaped object. The ECU is coupled to a microphone, the signal of which is used to estimate an ambient noise level. The intensity and frequency of the warning sound commanded from the front and/or rear speaker system is based on the ambient noise level.

10 Claims, 3 Drawing Sheets

(56) References Cited

U.S. PATENT DOCUMENTS

| | | | |
|---|---|---|---|
| 2009/0085770 A1* | 4/2009 | Mergen | 340/904 |
| 2009/0146799 A1* | 6/2009 | Goldstein et al. | 340/463 |
| 2010/0185411 A1* | 7/2010 | Pfeiffer et al. | 702/150 |
| 2010/0266135 A1* | 10/2010 | Theobald et al. | 381/71.4 |
| 2011/0128161 A1* | 6/2011 | Bae et al. | 340/901 |

\* cited by examiner

PEDESTRIAN ALERT SYSTEM AND METHOD

BACKGROUND

1. Technical Field

The present disclosure relates to a vehicle-mounted sound generator for emitting a warning sound, particularly to warn nearby pedestrians.

2. Background Art

The number of electric vehicles (EV) and hybrid electric vehicles (HEV) on the road is increasing. During electric-only operation, EVs and HEVs emit less running noise than a vehicle operating under power from an internal combustion engine. Although it is desirable to limit noise pollution, such quiet operation can be problematic to pedestrians, particularly pedestrians who have compromised eyesight. Providing an onboard speaker system to increase the total sound level from the vehicle has been previously proposed. The intensity of the sound provided by the speaker system is selected so that the vehicle is very likely to be heard regardless of other environmental factors. A problem with such an approach is that the sound intensity is more than necessary for many conditions. Higher than necessary sound intensity exacerbates sound pollution and is distracting and annoying to the driver of the vehicle and others in the vicinity of the vehicle who are not the target of the warning.

SUMMARY

A pedestrian warning or alert system and method are disclosed. The warning system is mounted on a vehicle configured to be propelled under electric power or other low-noise propulsion source. In one embodiment, the warning system includes a front speaker system, a rear speaker system, a front pedestrian detector, a rear pedestrian detector, and an electronic control unit (ECU) electronically coupled to the front speaker system, the rear speaker system, the front pedestrian detector, and the rear pedestrian detector. The ECU commands the front speaker system to emit a warning sound based on the front pedestrian detector detecting a pedestrian-shaped object and commands the rear speaker system to emit a warning sound based on the rear pedestrian detector detecting a pedestrian-shaped object. The ECU is also coupled to a microphone, the signal of which can be used to estimate an ambient noise level and frequency domain. The intensity and/or frequency of the warning sound commanded from the front and/or rear speaker system is based on the ambient noise level and frequency. One advantage is that by tailoring the warning sound to ambient noise level, it is only loud enough to be heard by a pedestrian.

In some embodiments, the sound produced is a siren, beep, or chirrup. In other embodiments, the sound is a recording of vehicle noises, such as tire noise, aerodynamic noise, internal combustion engine noise, and vehicle accessory noise. In one embodiment, the noise is directed with greater intensity in the direction of the pedestrian. In some embodiments, the warning sound is generated when the vehicle is operating under electric power only, i.e., no internal combustion engine noise. According to some embodiments, the warning sound is generated when the vehicle is moving in a predetermined speed range, i.e., above a minimum threshold and below a maximum threshold. Additionally, the head lights and/or tail lights can be flashed to alert the pedestrian. Also, the instrument panel can display a warning to the driver of the vehicle that a pedestrian is proximate the vehicle and/or a warning signal can be provided to the driver of the vehicle. If the driver fails to take mitigating action and a collision is determined to be imminent, control of the brake, steering, and/or powertrain system can be overridden to prevent such collision.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components or processes are arranged in a slightly different order than shown in the embodiments in the Figures. Those of ordinary skill in the art will recognize that the teachings of the present disclosure may be applied to other applications or implementations.

Figure 1:
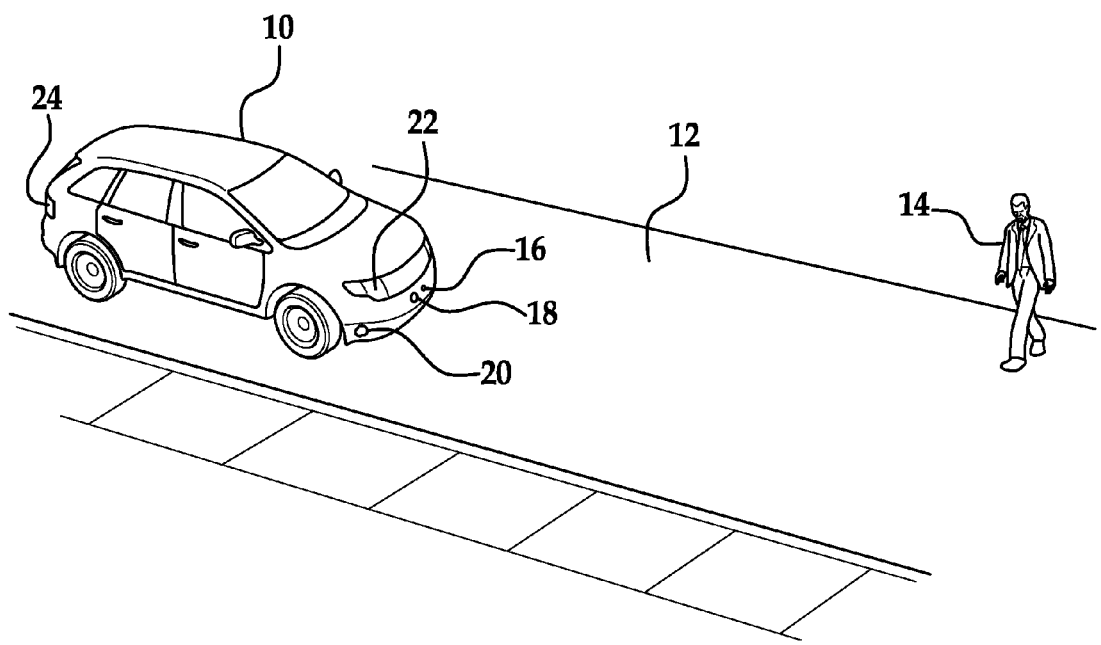
FIG. 1 is an isometric drawing of a vehicle encountering a pedestrian.

An electric vehicle 10 is shown moving along a roadway 12 with a pedestrian 14 in FIG. 1. Vehicle 10 is equipped with a pedestrian detection sensor 16 and a microphone 18. When a pedestrian is detected, a speaker system 20 generates a warning sound external to vehicle 10. Microphone 18 can be used to determine ambient noise level so that the intensity of the warning sound may be based on the level of ambient noise, i.e., a higher intensity warning sound when the ambient noise level is higher such that pedestrian 14 is properly warned, and providing a lower-intensity warning sound than when ambient noise level is less. In one embodiment, headlights 22 (only one visible in this view) are caused to flash to warn pedestrian 14, in the event that pedestrian 14 is detected by the pedestrian sensor 16 in front of the vehicle. Vehicle 10 in FIG. 1 is moving forward. Vehicle 10 can, of course, also move in reverse. Provisions to alert pedestrians located behind the vehicle are also provided according to some embodiments. Due to the view shown in FIG. 1, a pedestrian detection sensor and speakers mounted on the rear of vehicle 10 are not visible; however, in some embodiments, the sensor(s) and speakers are analogous to those mounted on the front the vehicle. One tail light 24 is visible in FIG. 1. The rear pedestrian detection sensor is located and oriented to detect pedestrians at the rear of vehicle 10. When the vehicle is moving in reverse and a pedestrian at the rear of the vehicle is detected, the rear speaker(s) are used to alert the pedestrian aurally and tail lights 24 are used to visually alert the pedestrian.

Figure 2:
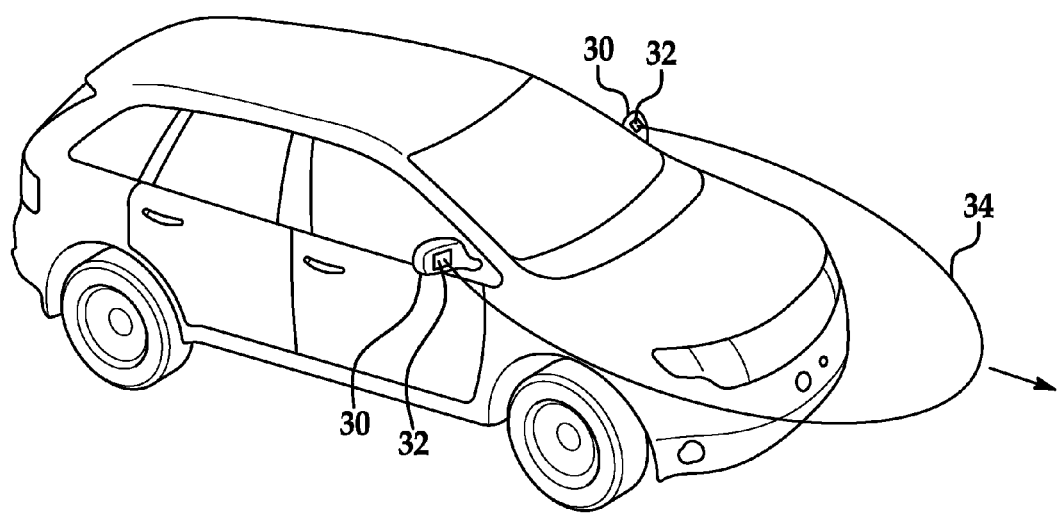
FIG. 2 shows a vehicle sound emission system according to one embodiment.

In one embodiment shown in FIG. 2, speakers 30 are placed on both of the rear-view mirrors 32 of vehicle 10 which provide an ultrasonic signal. Speakers 30 can be provided elsewhere on the vehicle. In a region where the two ultrasonic signals combine, a sonic warning sound wave 34 is provided moving forward from vehicle 10. Alternatively, sonic signals are provided by speakers 30 directed to provide higher intensity in a desired direction. Also, in embodiments with two speakers, the relative sound intensity of speakers 30 can be adjusted to provide a higher intensity toward a right or left direction as desired. For example, if it is determined that the vehicle is turning toward the right, then the intensity is greater on the right than the left.

Figure 3:
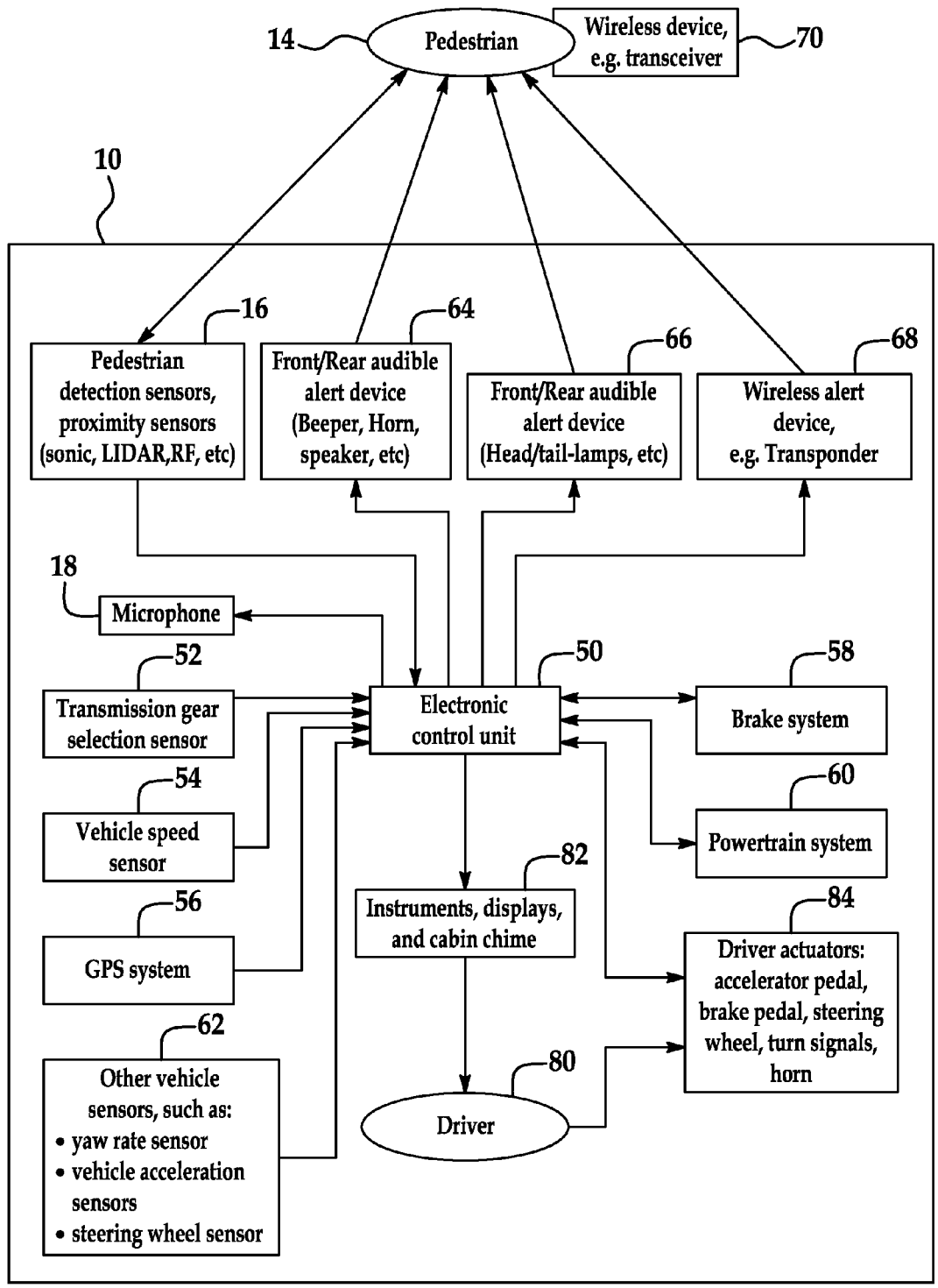
FIG. 3 is a schematic system overview of a pedestrian warning system.

An overview of a pedestrian warning system according to one embodiment of the disclosure is shown in FIG. 3. Vehicle 10 contains an electronic control unit (ECU) 50 which commands the alerts based on inputs from vehicle sensors. ECU 50 is shown as a single block in FIG. 3. Alternatively, the functions of ECU 50 may be performed on multiple processors for distributed computing. One or more pedestrian detection sensors 16 are electronically coupled to ECU 50. Based on signal(s) from pedestrian detection sensor(s) 16, the proximity of a pedestrian or a pedestrian-shaped object to vehicle 10 is determined. Depending on the type of sensor employed, the number of sensors employed, and how the data from the signal(s) are processed, in some embodiments, a plurality of pedestrians, their distance from vehicle 10, and their location with respect to the vehicle's path can be determined. As is known to one skilled in the art, pedestrian detection can be performed by proximity sensors based on sonic, LIDAR (Light Detection And Ranging), and/or RF (Radio Frequency) principles. Any suitable sensor can be employed to detect pedestrians proximate vehicle 10. A signal from pedestrian detection sensor 16 is provided to ECU 50. ECU 50 processes the signal to determine the likelihood of the presence of a pedestrian or a pedestrian-shaped object. ECU 50 may detect a highway barrel or a tree to be a pedestrian due to the shape of the object being close enough to a pedestrian shape to provide a false positive result. In one embodiment, the pedestrian alert is activated for false positives as well as for pedestrians since it is only a modest annoyance for alerts to be provided for a false positive, i.e., it is preferable to provide alerts whenever a pedestrian-shaped object is detected rather than to risk not providing the alert for an actual pedestrian by attempting to filter false positives. In another embodiment, an algorithm may be employed to filter out false positives to make it more likely that the pedestrian alert is activated for actual pedestrians rather than false positive situations.

ECU 50 is also coupled to microphone 18. By processing a signal from microphone 18, ambient noise level can be determined. In some embodiments, the ambient noise level is used to determine the intensity of a warning sound to alert the pedestrian. In one embodiment, the ambient noise level is directly based on the microphone signal. In another embodiment, the noise level from the vehicle is estimated based on at least one of vehicle speed, vehicle trajectory, accessory activity (pumps, fans, compressors, motors that are active and possibly on their speed), tire noise, etc. In such embodiment, the ambient noise level is determined as the total noise, as measured from microphone 18, minus the vehicle noise. In a further embodiment, analysis of ambient noise level can be performed as a function of frequency so that the alert sound can be provided at an appropriate intensity within a particular frequency range. For example, the microphone, in one embodiment, detects the intensity of ambient noise at frequencies between 20 Hz and 20 kHz. Based on a human equal-loudness curve, such as an A-weighting curve known to one skilled in the art, ECU 50 chooses a frequency and intensity of sound that has a high likelihood of being heard by a pedestrian, while minimizing the probability of unnecessary noise pollution to the environment. Because human hearing is more sensitive to mid-frequency sounds, as opposed to low-frequency or high-frequency sounds, the frequency of the warning sound is likely to be chosen from the 1000-3000 Hz range and based on the ambient noise frequencies, e.g., to avoid overlap so that the warning sound is noticeable.

A transmission gear selection sensor 52 signal is provided to ECU 50. When vehicle 10 is in park, pedestrian warning signals are not provided. Based on sensor 52 indicating a forward or reverse gear, the direction of vehicle 10 is known. In some embodiments, only when vehicle 10 is moving in reverse is the rear pedestrian detection and alert systems activated and only activated in the forward direction when vehicle 10 is moving forward. Alternatively, the direction of travel of the vehicle is determined via a GPS system or other vehicle sensors.

A vehicle speed sensor 54 is also electronically coupled to ECU 50. According to one embodiment of the disclosure, the vehicle warning system is active when vehicle 10 is moving, i.e., a speed greater than 0 mph. In an alternative embodiment, the vehicle warning system is active when vehicle 10 is moving at a speed greater than a first threshold speed, such as 2.5 mph. According to another embodiment of the disclosure, the vehicle warning system is active when vehicle 10 is moving at a speed less than a second threshold speed. The second threshold speed is a speed at which vehicle 10 produces enough noise due to tire noise, aerodynamic noise, etc. In some HEV embodiments, the second threshold speed is the speed at which the internal combustion engine is activated. In EV embodiments, an example of the second threshold speed is 30 mph. The values for first and second threshold speeds are examples only and not intended to be limiting. In some embodiments, intensity of the warning signal is further based on the speed of the vehicle, as determined from vehicle speed sensor 54. Pedestrians should have ample warning that vehicle 10 is approaching. When vehicle 10 is moving faster, a pedestrian who is farther away should be notified. Because sound intensity decreases the farther from the sound source, the faster vehicle 10 is moving, the more intense the warning sound should be to provide pedestrians an alert in enough time to avoid a collision. Also, as vehicle speed increases, the cone angle over which the warning sound is transmitted is decreased. As the vehicle is moving faster, pedestrians who are off to one side of the vehicle's trajectory are less likely to enter the vehicle's path because the vehicle is going to arrive sooner. Thus, by more tightly focusing the warning sound, pedestrians out of a zone of potential collision are less likely to be inadvertently alerted. When the vehicle is moving more slowly, pedestrians off to the side of the vehicle have more time to enter a collision zone with the vehicle. When the vehicle is moving more slowly, the warning sound is less focused.

According to some embodiments, a global positioning system (GPS) 56 communicates to ECU 50. In FIG. 3, lines are drawn between ECU 50 and various sensors and actuators. These lines, in some embodiments, are physical wire connections. Alternatively, ECU 50 may communicate wirelessly with some of the sensors/actuators. GPS 56 may communicate wirelessly with ECU 50 to provide information concerning vehicle speed, present vehicle path, roadway surface (which affects vehicle noise), roadway environmental condition, pedestrian pathways provided near the roadway, upcoming intersections, etc., as such data are available through satellite communication to an onboard transceiver that transmits this data to ECU 50.

ECU 50 is electronically coupled to a friction brake system 58. ECU 50 may determine whether the driver of the vehicle is actuating the brake system in some embodiments and how to what degree the brake system is actuated in another embodiment. ECU 50, in some embodiments, can override the driver's demand for braking and apply friction brakes to prevent a collision. ECU 50 may also be coupled to powertrain system 60. In EVs, the powertrain includes one or more electric motors. ECU 50 can command the electric motors to provide less power to the wheels or even cause the electric motors to provide braking by acting as generators. In HEVs, the powertrain includes an internal combustion engine as well as one or more electric motors. In some HEV embodiments, ECU 50 can turn on the internal combustion engine to quickly absorb some of the rotational inertia of the electric motors, i.e., to provide an additional measure of braking.

In some embodiments, ECU 50 is electronically coupled to one or more other vehicle sensors 62, which may include: a steering wheel angle sensor, a yaw rate sensor, and vehicle acceleration sensors, as examples. Signals from such sensors 62 may be used to determine a path of vehicle 10, an acceleration/deceleration rate, etc. Based on such information, a path of the vehicle can be estimated and compared to the pedestrian location to determine the likelihood of a collision.

Based on input from sensors, ECU 50 determines whether pedestrian alerts should be activated. ECU 50 is electronically coupled to an audible alert device 64. The audible alert device may be one or more of the vehicle's horn, an auxiliary beeper, or one or more speakers. In some embodiments, the speaker system provides a recording of normal vehicular noise to provide pedestrian 14 a warning that vehicle 10 is approaching. In some embodiments, it is preferable to provide a warning signal such as a horn, chirrup, siren, or beep to gain the pedestrian's attention. A visible alert is additionally provided, according to some embodiments. ECU 50 is coupled to head lights, or other front mounted lamps, and tail lights 66. The lights are flashed to provide a visual warning to pedestrian 14. In some embodiments, a wireless alert device 68 is provided on vehicle 10. Wireless alert device 68 communicates to a wireless device 70 carried on pedestrian 14 or proximate pedestrian 14. For example, if pedestrian 14 is a blind person wireless device 70 may be provided in a collar of a seeing-eye dog or on a cane, with wireless device 70 providing an audio alert in response to a command from wireless alert device 68. Alternatively, wireless alert device 68 may communicate with local cross-walk devices that may alter the "walk" or "don't walk" signals (visual and aural) concomitantly.

In some embodiments, ECU 50 provides a pedestrian warning to a driver 80 of vehicle 10 via instrument display(s) and cabin chime(s) 82. Driver 80 provides input to vehicle 10 through driver actuators 84: accelerator pedal, brake pedal, steering wheel, turn signals, horn, etc. Driver 84 may take evasive action based on the warning signal provided through instrument display and/or chime 82. Such evasive actions may be communicated to ECU 50 through the driver's actuator signals. For example, an accelerator pedal sensor coupled to ECU 50 provides an indication that driver 80 has backed off the accelerator pedal and a brake pedal sensor coupled to ECU 50 indicates whether driver 80 has depressed the brake pedal.

Figure 4:
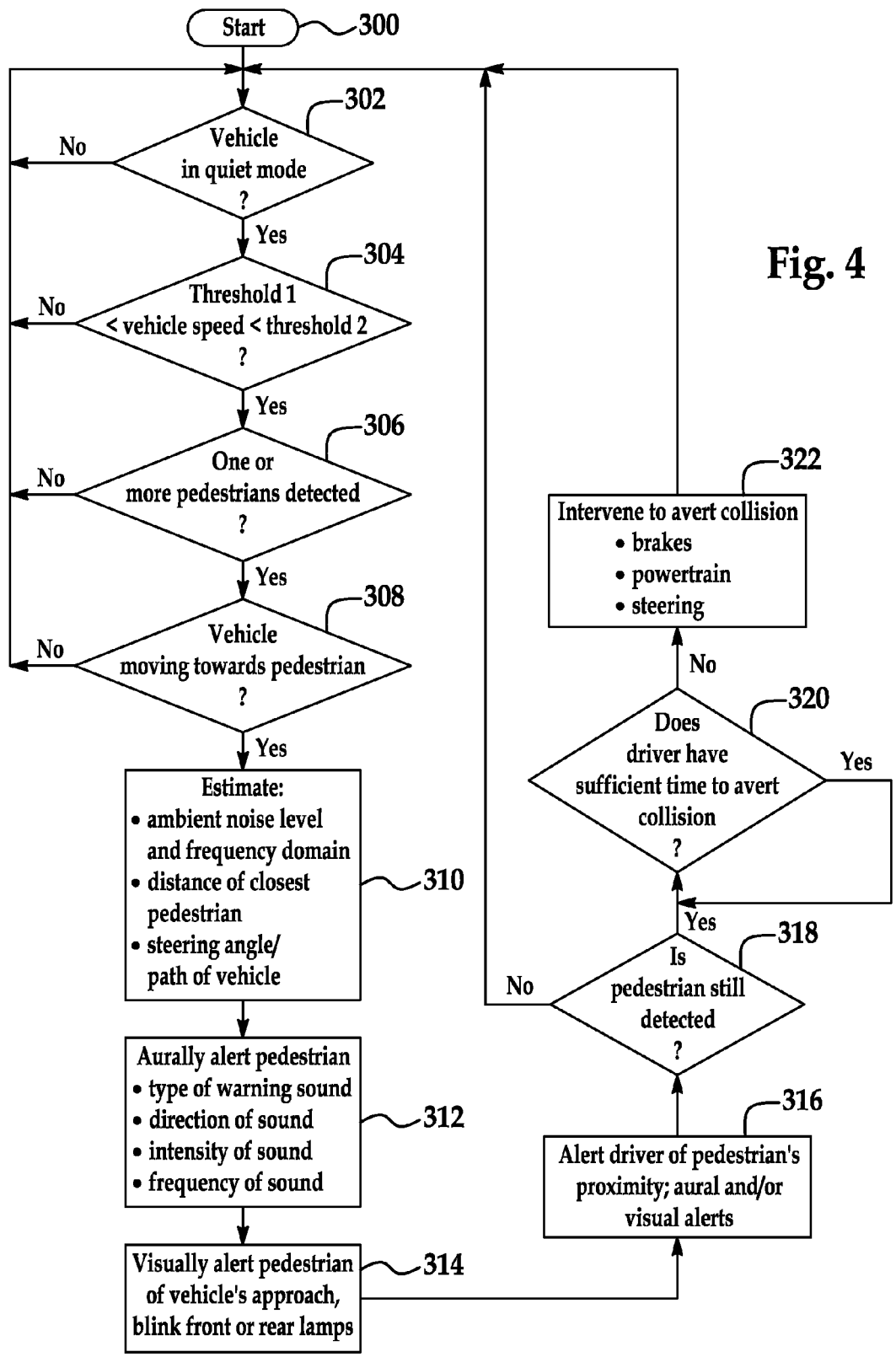
FIG. 4 is a flowchart of the pedestrian warning system according to one embodiment of the disclosure.

An example control strategy shown in FIG. 4 starts in block 300. In block 302, it is determined whether the vehicle is operating in a quiet mode, e.g., electric-only mode for a HEV. "Quiet mode" may or may not be a function of ambient noise. If not, control loops through 302 until a positive result and control passes to 304. In block 304, it is determined whether the vehicle is moving within a speed range that is of concern. If the vehicle is not moving, i.e., 0 mph or some other lower threshold speed, there is no concern that the vehicle will impact any person or object. If the vehicle is moving at a speed above an upper threshold speed, the vehicle generates sufficient noise due to road noise, aerodynamic noise, etc. to mitigate the issue of quiet running. If the vehicle is operating in between the lower and the upper threshold speeds, control passes to block 306. In one embodiment, the upper threshold speed is in the range of 30 mph. In another embodiment, there is no upper threshold speed, i.e., block 304 only detects whether the vehicle speed is greater than 0.

Based on pedestrian sensors on the front and/or rear of the vehicle, it is determined in block 306 whether there is at least one pedestrian detected by the sensors. As discussed previously, depending on the sophistication of the pedestrian detection sensor, the sensor may detect many other objects as qualifying as "pedestrians." For example, a barrel used as a road barricade or a tree trunk may erroneously be detected as pedestrians. If a routine can be determined to filter out false positive signals, then such a routine can be employed. Otherwise, according to one embodiment, block 306 yields a positive result when any pedestrian-shaped object is detected and control passes to block 308. According to block 306, the detection is performed based on sensors mounted at the front and rear of the vehicle. Also, it is determined whether there are multiple pedestrians within the range of detection of the sensors.

In block 308, it is determined whether the vehicle is moving toward the pedestrians. For example, if the vehicle is moving forward, then the presence of pedestrians behind the vehicle does not pose a concern. In an alternative embodiment, the direction of travel of the vehicle is determined prior to pedestrian detection. In such an alternative, if it is determined, for example, that the vehicle is moving forward, and thus, pedestrian detection is only performed with pedestrian detection sensor(s) oriented toward the front of the vehicle. If a positive result in block 308, i.e., if the vehicle is moving toward at least one of the detected pedestrians, control passes to block 310. If a negative result in any of blocks 302, 304, 306, or 308, control passes back to block 302.

In block 310, ambient noise level is estimated. A total noise level can be measured by a microphone. In one embodiment, ambient noise level is based solely on the total noise level. In other embodiments vehicle noise due to one or more vehicle activities and/or systems such as tire noise, pump noise, compressor noise, etc., can be estimated. Ambient noise can then be estimated based on total noise minus vehicle noise. An improved estimate can be made based on frequency analysis, available information about road/tire conditions affecting tire noise, vehicle speed, compressor speed, compressor on/off condition, etc. In one embodiment, the frequency domain of the estimated ambient noise is determined. In block 310, the distance of the closest pedestrian in the direction of travel of the vehicle is estimated. Also in block 310, the steering angle is detected to determine a direction of travel of the vehicle with a higher degree of precision than simply forward or reverse. Block 310 is simply one example embodiment. Estimates of pedestrian distance from the vehicle and steering angle are optional and not included in other embodiments.

Control passes to block 312 in which an aural alert is generated to warn pedestrians. If the vehicle is moving forward, only forward-directed speaker(s) are used. In one embodiment, the sound intensity in the direction of travel of the vehicle is greater than in the other directions. In the event that a steering angle estimate is available, the sound intensity direction is based on the direction of travel of the vehicle with greater precision than simply frontward or rearward. The character of the sound, in one embodiment, is a recorded vehicle sound. The sound may be of a vehicle having an internal combustion engine or simply noise generated by a vehicle operating under electric-only operation, but amplified. In other embodiments, the sound is a chirrup, a recorded voice, or other suitable warning signal. The intensity of the warning sound is based on the estimated ambient noise level. In one embodiment, the frequency domain of the warning sound is based on the frequency domain of the ambient sound so that the warning sound is more easily detected by the pedestrian.

Control passes to block 314 in which a visual alert is provided to the pedestrian by blinking the headlights when vehicle is moving forward or tail lights when the vehicle is moving in reverse.

Control passes to block 316 to alert the driver of the proximity of a pedestrian. The driver's signal can be one or both of a visual alert in the instrument cluster or an aural alert by providing a warning chime, alarm, voice, or other suitable sound.

In block 322, the driver's inputs to the brake and steering wheel may be overridden or supplemented to cause the vehicle to travel in a path to avoid a collision with the pedestrian. Such intervention is not to be employed lightly, i.e., it can be employed when a collision is certain or nearly certain. Thus, in block 318, it is determined whether the pedestrian is still being detected by the pedestrian detection sensor(s). If not, control passes back to 302, i.e., not getting to block 322. Further, it is determined in block 320 whether the driver has sufficient time to avoid the collision. If so, control passes back to block 318 to ascertain once again whether a pedestrian is detected. If a negative response in block 320, control passes to block 322 in which intervention in the form of powertrain intervention, brake application and possibly a steering intervention (in electric power steering systems) to avoid a collision is commanded. In alternative embodiments, one or two of the intervention techniques are employed. Powertrain intervention can include: commanding the electric motor to reduce the power provided to the wheels, turning on the internal combustion engine (in HEVs) so that rotational inertia in the powertrain system is absorbed in spinning up the internal combustion engine, and commanding the electric motor to operate as a generator thereby braking the powertrain system.

The control algorithm in FIG. 4 illustrates a particular order of the processes. However, the order can be rearranged and remain within the scope of the disclosure. Furthermore, alternative embodiments do not include all the procedures described in relation to FIG. 4.

While the best mode has been described in detail, those familiar with the art will recognize various alternative designs and embodiments within the scope of the following claims. Where one or more embodiments have been described as providing advantages or being preferred over other embodiments and/or over prior art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. The embodiments described as being less desirable relative to other embodiments with respect to one or more characteristics are not outside the scope of the disclosure as claimed.

What is claimed:

1. A method for a vehicle to warn pedestrians, comprising:
   measuring a total noise level proximate the vehicle using a vehicle-mounted microphone;
   determining an estimated vehicle noise level based on at least one of vehicle speed, vehicle trajectory, and vehicle accessory activity;
   estimating an ambient noise level proximate the vehicle by subtracting the estimated vehicle noise level from the total noise level; and
   generating a warning sound external to the vehicle based on a signal from a pedestrian detection sensor wherein at least one of an intensity or a frequency of the warning sound is based on the ambient noise level.

2. The method of claim 1 wherein the pedestrian detection sensor is one of a LIDAR, radio frequency, and sonic detector.

3. The method of claim 1, further comprising:
   processing the signal from the pedestrian detection sensor to determine whether a pedestrian-shaped object is proximate the vehicle wherein the warning sound is based on such determination of a pedestrian-shaped object being proximate the vehicle.

4. The method of claim 3, further comprising:
   processing the signal from the pedestrian detection sensor to further determine a distance and location of the pedestrian-shaped object with respect to the vehicle.

5. The method of claim 1 wherein the vehicle accessory comprises at least one of a fan, a pump, and a compressor.

6. The method of claim 1 wherein the warning sound comprises a sound recording including at least one of: white noise, vehicle accessory noise, vehicle aerodynamic noise, engine noise, and vehicle road noise.

7. The method of claim 1, further comprising:
   determining a direction in which the vehicle is moving;
   emitting the warning sound directed toward the front of the vehicle when the vehicle is moving forward; and
   emitting the warning sound directed behind the vehicle when the vehicle is moving in reverse.

8. The method of claim 3, further comprising:
   estimating a distance between the vehicle and the pedestrian-sized object wherein the intensity of the warning sound is further based on the distance between the vehicle and the pedestrian-sized object;
   estimating a vehicle speed wherein the intensity of the warning sound is further based on the vehicle speed with intensity increasing as vehicle speed increases; and
   focusing the warning sound over a narrower cone angle when vehicle speed increases.

9. The method of claim 1 wherein the vehicle is a hybrid electric vehicle and the generating the warning sound is further based on the vehicle being propelled by electric power only.

10. The method of claim 1 wherein the generating the warning sound is further based on a speed of the vehicle being greater than a first threshold and less than a second threshold.

* * * * *